United States Patent Office 3,654,256
Patented Apr. 4, 1972

3,654,256
PAPER SIZE FROM NEUTRALS-FREE RESIN ACIDS
Glen W. Hedrick, Lake City, Fla., Hugh B. Summers, Jr., Savannah, Ga., and John B. Lewis, Lake City, Fla., assignors to the United States of America as represented by the Secretary of Agriculture
No Drawing. Filed Mar. 25, 1969, Ser. No. 810,379
Int. Cl. C09f 1/04
U.S. Cl. 260—105
3 Claims

ABSTRACT OF THE DISCLOSURE

Alkaline salts of resin-acids-containing materials were converted to sodium resinates, the resinates were refluxed in acetone, the solids separated from the liquids, and the solids dried to yield a neutrals-free product useful as an improved paper size.

A non-exclusive, irrevocable, royalty-free license in the invention herein described, throughout the world for all purposes of the United States Government, with the power to grant sublicenses for such purposes, is hereby granted to the Government of the United States of America.

This invention relates to an improved paper size and to a process for the preparation of said improved paper size from rosin. More specifically, this invention relates to the removal of nonacidic components from rosin to yield a neutrals-free mixture of resin acids which should be useful to the paper-making industry.

The main object of the instant invention is to provide a process for making a neutrals-free resinous product.

A second object of the instant invention is to provide a process for producing an improved paper size.

A third object of the instant invention is to provide an improved paper size.

A method of making size from pine gum by the removal of turpentine from a neutralized gum by steam distillation is disclosed in U.S. Pat. 2,846,430 issued to Ray V. Lawrence, et al.

H. B. Summers, Jr. and G. W. Hedrick disclosed a method of preparing a completely neutralized dry size. This method (see I. & E. C. Product Research and Development 1, 56 (1962), p. 57) employs the Lawrence et al. techniques in combination with the Summers et al. techniques.

We now have found that dry sodium resinates—the dry sodium salts of resin acids such as those obtained by neutralizing the resin acids of rosin—are insoluble in acetone. Accordingly, when the dried size described by Summers et al. was slurried in acetone and filtered, the cake obtained in essentially quantitative yield was free of nonacidic components. Paper size (sodium resinate) prepared in this manner had superior paper sizing properties.

Dry gum rosin size prepared by neutralizing gum rosin with aqueous sodium hydroxide and drying in a ball mill in accordance with the process of Summers et al. was converted to a more efficient size when slurried with acetone to remove the nonacidic components.

A neutrals-free rosin was obtained by the quantitative precipitation of the resin acids from a heptane solution of pine gum by addition of anhydrous ammonia. The ammonium salt was converted to a sodium salt by addition of sodium hydroxide and drying.

In general the instant invention can best be described as a process for producing improved paper size from neutrals-free acids, comprising:

(a) preparing sodium resinates from resin-acids-containing material, (b) mixing in about 1:1 weight to weight ratio a quantity of acetone and refluxing the mixture for about one hour to dissolve the neutral components, (c) separating the sodium resinates from the dissolved neutral components, and (d) drying the sodium resinates in an oven equipped with a water aspirator vacuum to obtain a neutrals-free resin-acid paper size.

EXAMPLES

Neutrals-free alkaline salt resinates were prepared employing various methods. To determine their potential use as sizing materials each was submitted to a standard lactic acid penetration test wherein the fibrous material is made into a sheet containing the sizing material, etc. The resinates were prepared as follows:

(1) A bulk quantity of pine gum was used to precipitate the resin acids with 2-amino-2-methyl-propanol-1, employing the Summers et al. technique which was disclosed in I. & E. C. Product Research and Development, vol. 2, No. 3, pp. 175–176, September 1963. A quantity of 1000 grams (3.22 moles) of the resin acid mixture (rosin)—neutral equivalent 310—was dissolved in 458 ml. of water in which 120 grams of sodium hydroxide had been dissolved.

The mixture was dried in a ball mill in accordance with the technique disclosed by Summers et al. in another I. & E. C. paper (see vol. 1, page 57, March 1962). The dried product was an almost colorless white powder, of which an 858 gram quantity was obtained. The actual yield was 85.8%.

(2) A 500 gram quantity of commercial gum rosin neutral equivalent 346 was neutralized with a solution prepared upon mixing 59 grams of sodium hydroxide with 210 grams of water, then drying the product in a ball mill in accordance with the Summers et al. process. A dried powder powder weighing 284 grams was obtained. The actual yield was 56.8%.

(3) A 100 gram quantity of the Example 2 above preparation was mixed with 500 ml. acetone and refluxed for one hour. Insoluble materials were removed by filtration, and the product was dried in an oven equipped with a vacuum aspirator. The powdery product weighed 86 grams. The actual yield was 86%.

(4) A 100 gram quantity of pine gum, 78 grams of which was resin acids, was dissolved in 500 grams hexane, filtered to remove trash, then saturated with ammonia gas at room temperature by passing ammonia into the solution. The insolubles were filtered off, and the product was dried. Five such batches yielded an almost colorless product. The product thus obtained from the five batches yielded 413 grams. The actual yield was 100%.

From the total product a quantity of 326 grams (1 mole) was neutralized with 40 grams sodium hydroxide dissolved in methanol. This sodium resinate was dried in vacuo.

TESTS

Paper size tests were performed by industrial size manufacturers. In general, TAPPI Standards & Suggested Methods, Test number T433 m–44 is employed for penetration evaluation. One company reported that the lactic acid penetration time (in seconds) for a conventional gum rosin size was 733±50 sec., and by comparison a neutrals-free rosin size, specifically Example 3, above, gave a penetration time of 1574±32 sec.

In another test, a conventional rosin size had a penetration time of 697±22 sec., and a neutrals-free size which was prepared by the process of Example 1 had a penetration time of 1118±28 sec. The same pine gum was used to make the two different sizes.

Samples of neutrals-free rosin sizes, which is the process of this invention, illustrated in Example 3, were prepared and evaluated by other size manufacturers. The results of the tests substantiate our evaluations, and we have concluded that neutrals-free dry sizes were found superior to commercial dry sizes, and were comparable to the commercial fortified sizes. "Fortified size" is the name for a commercial size made by reacting rosin with a small amount (usually 4 pounds per every 100 pounds of rosin) maleic anhydride prior to neutralization. These sizes are about 20% to 25% more effective than an untreated size.

We claim:
1. A process for producing a mixture of neutrals-free, sodium resinates useful as a paper size, comprising:
   (a) mixing a dry composition consisting essentially of sodium resinates and nonacidic materials known as neutrals with acetone in a 1:1 weight ratio, said dry composition having been prepared by dissolving gum rosin, consisting essentially of resin acids and said neutrals, in aqueous sodium hydroxide to convert the resin acids to the corresponding sodium resinate salts and drying the resulting composition;
   (b) refluxing the resulting mixture of the dry composition and acetone for about one hour to dissolve the neutrals;
   (c) separating the sodium resinates from the dissolved neutrals; and
   (d) drying the separated sodium resinates.
2. A process for producing a mixture of neutrals-free, sodium resinates useful as a paper size, comprising:
   (a) mixing a dry composition consisting essentially of sodium resinates and nonacidic materials known as neutrals with acetone in a 1:1 weight ratio, said dry composition having been prepared by dissolving pine gum, consisting essentially of resin acids and said neutrals, in hexane, filtering the resulting solution to remove trash, saturating the filtered solution with ammonia gas at room temperature by passing ammonia gas into the solution, thereby to convert the resin acids to their corresponding ammonium resinate salts, filtering off the insolubles, drying the resulting insoluble-free product, converting the ammonium resinates to the corresponding sodium resinate salts by addition of sodium hydroxide, and drying the resulting composition;
   (b) refluxing the resulting mixture of the dry composition and acetone for about one hour to dissolve the neutrals;
   (c) separating the sodium resinates from the dissolved neutrals; and
   (d) drying the separated sodium resinates.
3. The process of claim 2 wherein the solvent for the pine gum is heptane.

References Cited

UNITED STATES PATENTS 2,580,496   1/1952   Zeiss _____ 260—105

OTHER REFERENCES

Mantel et al.: "Industrial and Engineering Chemistry," 1937, pp. 262 and 263.

Harris, George C.: "Encyclopedia of Chemical Technology," 1953, p. 801.

"Industrial and Engineering Chemistry," 1963, p. 177 relied on.

DONALD E. CZAJA, Primary Examiner

W. E. PARKER, Assistant Examiner

U.S. Cl. X.R.

106—236; 162—180